May 28, 1968 G. P. AVALEAR 3,384,970
PRECISION COORDINATES MEASUREMENT APPARATUS
FOR GAGING AND LAYOUT OPERATIONS
Filed Sept. 22, 1965 2 Sheets-Sheet 1

INVENTOR,
Garry P. Avalear,
BY
ATTORNEY.

May 28, 1968  G. P. AVALEAR  3,384,970
PRECISION COORDINATES MEASUREMENT APPARATUS
FOR GAGING AND LAYOUT OPERATIONS
Filed Sept. 22, 1965  2 Sheets-Sheet 2
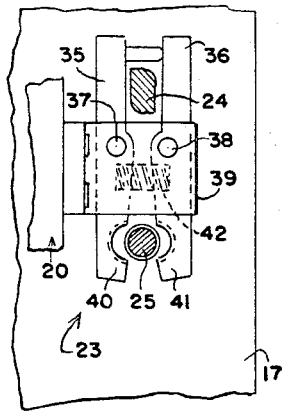
FIG.2
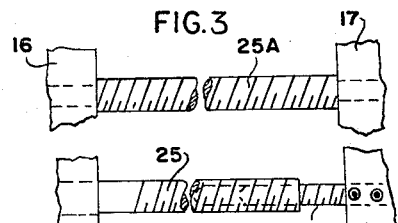
FIG.3
FIG.4
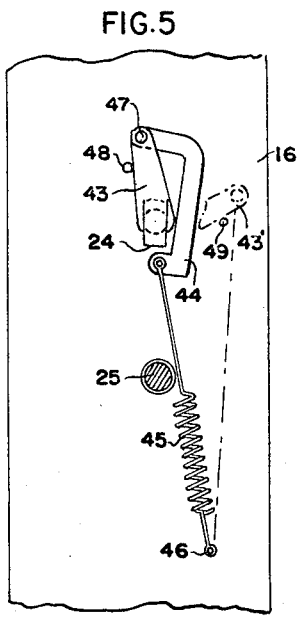
FIG.5
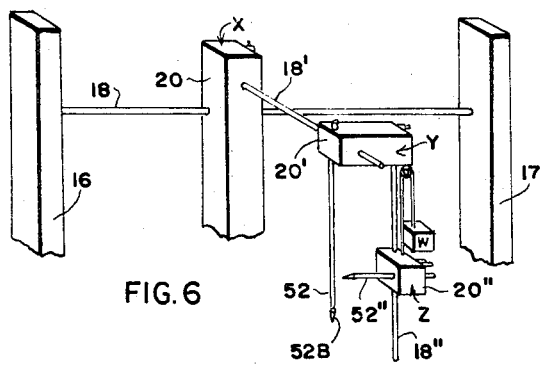
FIG.6
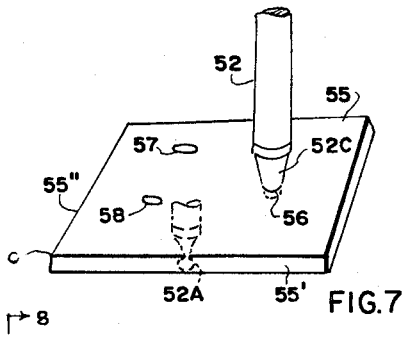
FIG.7
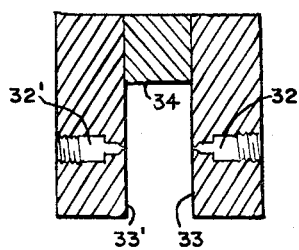
FIG.8
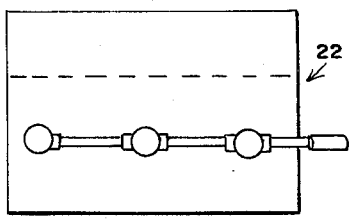
FIG.9
INVENTOR,
Garry P. Avalear,
BY
ATTORNEY.

United States Patent Office 3,384,970
Patented May 28, 1968

3,384,970
PRECISION COORDINATES MEASUREMENT APPARATUS FOR GAGING AND LAYOUT OPERATIONS
Garry P. Avalear, Hyde Park, N.Y., assignor to Boice Gages, Inc., Hyde Park, N.Y., a corporation of New York
Filed Sept. 22, 1965, Ser. No. 489,211
7 Claims. (Cl. 33—189)

ABSTRACT OF THE DISCLOSURE

A first slide bearing structure of the air film type, is on a first horizontal track which extends from left to right above a forwardly extending horizontally positioned surface plate. A second slide bearing structure, of the same type, is on a second horizontal track which extends forwardly above the surface plate, from said first slide bearing structure, and a vertically slidable vertical probe on the second slide bearing structure. There are micrometer mechanisms to control independent movement of the slides. If desired, there may be a third slide structure on a third track extending vertically downward from the second slide, with a second probe horizontally positioned and arranged for longitudinal movement on the third slide, both probes being coplanar. Also shown is a means on the second slide for counterbalancing the third slide, its probe and track.

---

The present invention relates to gage and layout apparatus for checking the coordinates of hole centers and of locations of other formations in a piece of work, and for testing squareness and generally for use in layout work.

An object of this invention is to provide precision gage and layout apparatus of the character mentioned and of novel and improved construction, which essentially comprises a surface plate to support the work, and associated track and slide structures affording extremely easy slide movement by a slight hand force for travel of comparatively long distances and micrometer movement to edge the slides to exact position respectively; slide positions from a fixed zero on the surface plate, being indicated preferably by optical-electronic means giving direct readings as is well known in the linear measurement art. All slides except one carry a probe or center punch.

Another object is to provide a novel and improved gage and layout apparatus of the kind described, in which binding actions caused by the moments of the slides and their appurtenances as heretofore experienced, are avoided.

Still a further object of this invention, is to provide a novel and improved gage and layout apparatus of the character set forth, which is easy to understand and use, reasonable in cost to manufacture, and efficient in carrying out the purposes for which it is designed.

Other objects and advantages will become apparent as this disclosure proceeds.

In the practice of this invention, an apparatus for determining the X and Y coordinates, has two slides along horizontal tracks; the tracks of one being perpendicular to the tracks of the other, and all said tracks being above the position of a surface plate on which a work piece to be checked or have layout work done thereon, is mounted; said surface plate extending in front of the X tracks, and the Y tracks being above said surface plate. (For a simple manner of nomenclature herein, all appurtenances of structure will be preceded by the letter designating the coordinate it is related to.) Each slide is on two parallel track members which are vertically spaced, hence each slide includes two bearing structures which for this apparatus are of the compressed air film type. Of each pair of track members, one is of round and the other of rectangular cross section preferably; each bearing which rides on a track of rectangular cross section is a channel straddling same. The X slide is movable between the side ends of the surface plate and its track members span two spaced frame members. The tracks for the Y slide extend forwardly from the X slide. For an apparatus which shall also determine the Z coordinate, the slide for the latter is on a pair of vertical track members extending downwardly from the Y slide and preferably the Z slide and its appurtenances are counterbalanced. A vertical, longitudinally adjustable probe or center punch is slidably carried by the Y slide and extends downwardly towards the surface plate. When the Z coordinate determining means is included in the apparatus, a longitudinally adjustable probe or center punch is slidably carried in horizontal position on the Z slide. The bearing and track structures for all the slides are of identical construction. Each slide is freely movable by a slight hand force, but there is a clutch-controlled provision to move the slides independently by micrometer screw means and a means to releasably maintain any clutch in operative condition, once it is so set, may be included.

In the accompanying drawings forming part of this specification, similar characters of reference indicate corresponding parts in all the views.

FIG. 2 is a fragmentary side elevation of mechanism associated wtih each of the slides, to make micrometer movement thereof effective by the shift of a cam rod.

FIG. 3 is a fragmentary front view of a screw, one of which is included in each of the units X, Y, and in Z when a Z unit is part of the apparatus.

FIG. 4 is a view like 3, but of a modified construction.

FIG. 5 shows mechanism around one end of a cam rod to hold it in set position.

FIG. 6 is a diagrammatic perspective view of an apparatus which includes all of FIG. 1 for determining the X and Y coordinates, and also an additional unit for determining the Z coordinate.

FIG. 7 is a fragmentary perspective view of a probe applied to a work piece being checked.

FIG. 8 is a section taken at line 8—8 in FIG. 9, showing a bearing, one of which is on each of the slides; such bearing riding on the track member which is of rectangular cross section.

FIG. 9 is an end view of FIG. 8.

Figure 1:
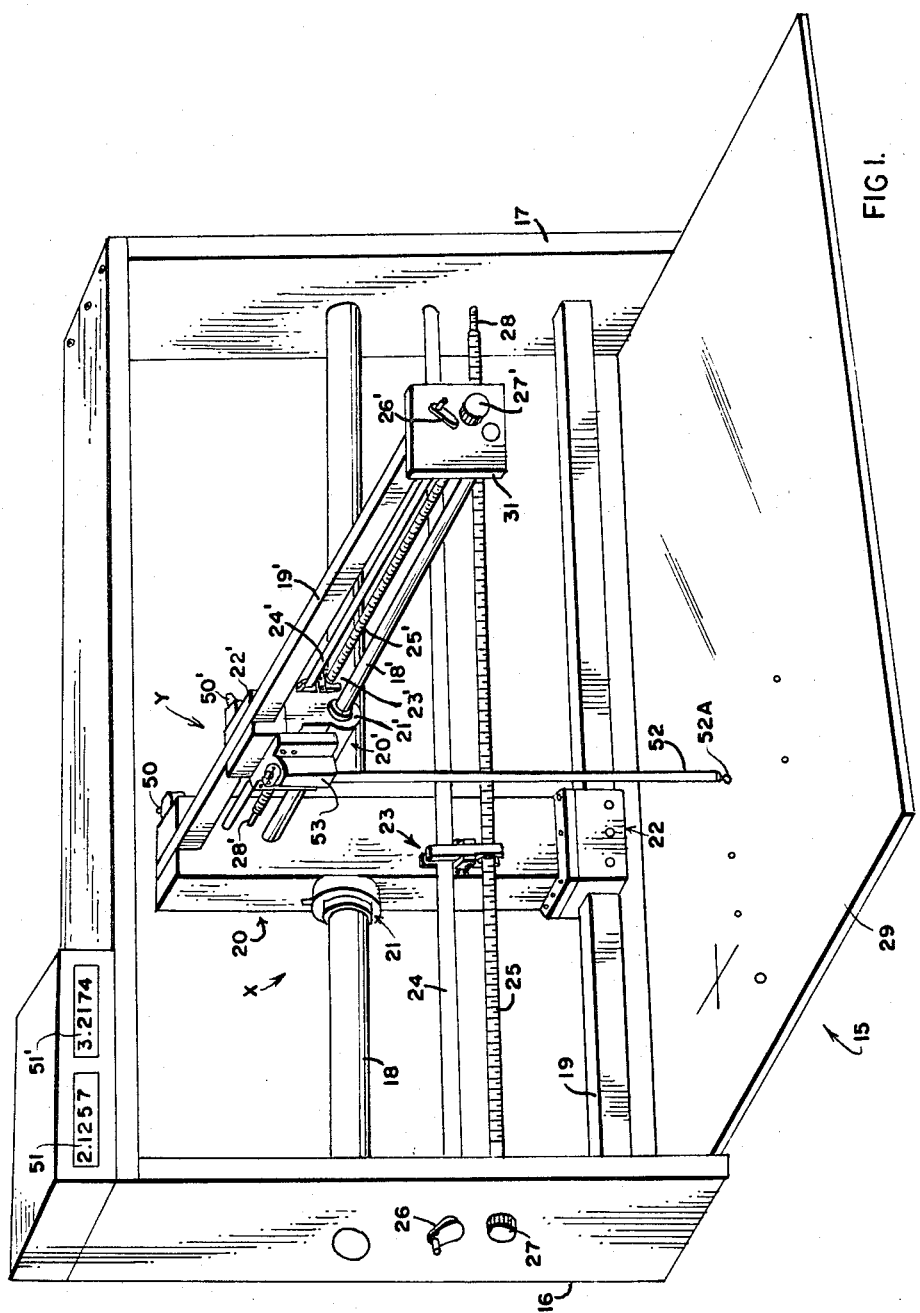
FIG. 1 is a perspective view of an apparatus for determining the X and Y coordinates, embodying teachings of this invention. Various details have been omitted to attain clarity of illustration, and since no claim is made to the optical electronic system heretofore mentioned, very little of it is included.

In the gage apparatus indicated generally by the numeral 15 in the drawings, the opposite upright side frame members 16, 17 support between them, the vertically spaced horizontal track rods 18, 19, having the slide 20 mounted thereon by its slide bearings 21 and 22, for movement therealong. Said slide 20 carries forwardly thereof between said bearings, a normally-open clamp-nut device denoted generally by the numeral 23, which when operated to close by a partial turn of the cam rod 24, threadedly engages the screw 25 which is along but spaced from the cam rod. Said cam rod is journalled in said frame members 16, 17 and has an outside crank handle 26 to turn it. Said screw 25, at one end is slidably mounted through the frame member 16, and carries the outside knob 27 to turn it when the clamp-nut engages it. Said screw and cam rod are parallel to the path of movement of the slide 20. The other end of the screw 25 is a bit away from the frame member 17, where it has an axial threaded bore, in which one end of a relatively short screw 28 is threadedly engaged; the other end of said short screw 28 being fixed to the frame member 17. Between said frame members and forwardly thereof, there is a horizontal surface plate 29 on which the work piece is to rest.

Extending forwardly from the upper end of the slide 20, are the vertically spaced horizontal track rods 18', 19', which are parallel to each other and perpendicular to the track rods 18, 19. The forward ends of said track rods 18', 19' terminate in a plate 31. A slide 20' is mounted on said track rods 18', 19' by its slide bearings 21', 22', and forwardly thereof, said slide 20' carries the vertical probe 52 in a slide bearing 53, from which it depends towards the surface plate 29, and is of course slidable along the vertical. The slide 20' is always above the said surface plate. Said slide 20' carries rearwardly thereof between its bearings 21', 22', a normally-open clamp-nut device 23', which when operated to close by a partial turn of the cam rod 24', threadedly engages the screw 25' which is along but spaced from said cam rod 24'. Such cam rod is journalled in the body of the slide 20 and the frame plate 31, and has the outside crank handle 26' to turn it. The screw 25', at one end is slidably mounted through the frame plate 31 from which it extends, where it carries the outside knob 27' to turn it when the clamp-nut device 23' engages it. Said cam rod 24' and the screw 25' are parallel to the path of movement of the slide 20'. The other end of the screw 25' is a bit away from the slide 20 where it has an axial threaded bore in which one end of a relatively short screw 28' is threadedly engaged; the other end of such short screw being fixed to the slide 20.

In order that the slides 20, 20' shall be extremely easily movable along their respective tracks by a slight finger tip push, the bearings 21, 21', 22, 22' are of the compressed air film type, of which 21, 21' for the circular shafts 18 and 18', are well known, but the construction of the bearings 22, 22' for the rectangular tracks 19, 19', have been specially designed, and specifically shown in FIGS. 8 and 9. Each of these bearings 22, 22' is a channel in which their respective rectangular track members are fitted, with provision of connected nozzles 32 to be fed compressed air to create an air film between one inner wall 33 of the channel and one face of the track therein, and the connected nozzles of the series 32' to be fed compressed air to create an air film between the opposite inner wall 33' of the channel and the opposite face of the track therein; such air film also occurring on the channel's floor surface 34. During use of this apparatus, this compressed air supply is continuous. While the screws 25 and 25' are not in engagement with the clamp nuts 23 and 23' respectively, meaning while such clamps are open, their associated slides 20, 20' can be very easily moved by hand, by a mere push with a finger, though the apparatus is large.

Each clamp-nut device as 23, acts in the manner of a sort of clutch, to connect its associated slide so it can be driven by a micrometer screw which is turnable by hand. All such devices in this apparatus are identical, so a specific description of 23 will suffice for the others. Essentially the device 23 is a clamp structure comprising two levers 35 and 36 which are pivotally mounted intermediate their respective ends at 37 and 38 respectively, to be opposite each other on a bracket 39 which is fixed on the slide 20; the screw 25 being intermediate a pair of corresponding ends of said levers which constitute the jaws 40 and 41 of said clamp. Said jaws are normally apart and away from the screw 25, and each jaw is the segment of a nut so when brought into contact with said screw it is threadedly engaged therewith. A tensed compression coil spring 42 interposed between the jaw ends of said levers, maintains the clamp in open condition. The cam bar 24 is intermediate the other ends of said levers, and when turned a quarter turn, will close the clamp-nut device. As a positive lock to hold said cam bar in such position, each of them may be associated with the mechanism as is for instance shown in FIG. 5, wherein said cam bar has a lateral arm 43 extending therefrom, whose distal end is linked in pivotal connection with the distal end of one of the legs of a U-piece 44. A tensed tension coil spring 45 is connected at one end to the distal end of the other leg of said U-piece, and the other end of said spring 45 is fixed to the frame 16. This arrangement also keeps the cam bar 24 securely in its position as shown in FIG. 5 and FIG. 2, when the clamp device 23 is open. Dimensions of the parts are chosen so that when the cam bar is in the position shown in FIGS. 2 and 5, the axis of rotation of said cam bar, is off the line connecting the points 46 and 47, after such line has passed such axis by turning the handle 26 to shift the cam bar 24 from horizontal to vertical position where the arm 43 is stopped by the pin 48. When the cam bar is turned back to horizontal position to close the jaws 40, 41, said arm 43 assumes the position shown at 43' against the stop pin 49.

For the illustrated embodiment 15, suitable means to be included to measure slide travel, is preferably a well known precision optical electronic system in association with each slide. Carried by each slide therefor is a light ray projector. The projector 50 on the slide 20 of the X-unit, is for directing a light ray rearward, and the projector 50' on the slide 20' is for directing a light ray to the right. These light rays play on suitable optical systems which operate electronically controlled means for translating the lateral movement of the respective rays into visible notations appearing at the indicators 51, 51' respectively. Successive measurements indicated, are of extremely minute additions or substractions in length and very precise. Such precision systems, adaptable to indicate the respective movements of the slides 20, 20', from a fixed zero point 0 on the surface plate, are known to those versed in the linear measurement art, and being no part of this invention, no further illustration is given, but note is made that same are marketed products of W. & L. E. Gurley, Troy, N.Y. The set up in the apparatus 15 is preferably such, that the reading at each of 51, 51' is zero, when the axis of the probe 52 is at point 0.

The use of the slidably mounted screw 25, associated as explained with the fixed screw 28, offers minuter measurable movements for a slide than is obtained when the micrometer screw structure used is the journalled screw 25A of FIG. 4. Having the screw 25A with 40 threads to the inch, it is evident that when a slide is driven thereby, a 1/25 turn of such screw will move the slide 0.001 inch. However, with the arrangement shown in FIGS. 1 and 3, where right-handed screw 28 screws into the right-handed screw 25, and if the screw 25 has 40 threads to the inch outside, and its interior thread engaging the screw 28 and said screw 28 have threads of 44 and 4/9 to the inch, then when a slide is engaged to be driven by the screw 25, the slide will be moved 1/400 of an inch for each turn of the screw 25, and hence a 1/25 turn of said screw 25, will cause movement of the slide only to the extent of 0.0001 inch. Of course, if desired, suitable scales may be provided along the screws and graduated thimbles on such screws, can be used as in ordinary micrometer construction practice, in lieu of the optical-electronic systems mentioned.

As mentioned, the apparatus 15 is for precisely laying out work, as for instance to locate the centers on the work-piece 55, of the holes 56, 57 and 58 to be drilled, and also to test the correctness of work done on a piece, as for instance, having the drilled plate 55, to determine what the position of the center of each of said holes is, in relation to reference edges on the plate 55.

To use the apparatus for any purpose, the bearings 20 and 20' are of course fed compressed air and the indicator apparatus whose ultimate showings are at 51, 51' is actuated. Then the plate 55 is set true and secured onto the surface plate 29, meaning that the edge 55' shall be parallel to the line of movement of the X-unit. For such purpose the probe tip 52A used is spherical and of known radius. The plate 55 is frictionally held on the surface plate, as for instance by suitable clamps, not shown, which are maintained by bolts engaged in the threaded holes 59, or by other suitable means. The plate 55 is shifted so its edge 55' appears parallel to the line of movement of the X-unit. To true the plate 55, the slides 20 and 20' are manually moved until the spherical probe tip 52A is in contact with the edge 55', while the probe is held raised off the surface plate 29 by a thumb set screw 60. The reading on the indicator 51' is noted, while the slide 20 is moved so the probe tip will travel along said edge 55'. The position of the plate 55 is manually adjusted until such reading on 51' is constant. Then the plate 55 is secured by tightening the clamps holding it to the surface plate 29. If the edge 55'' of the plate 55 is true square to the the edge 55', the reading on the indicator 51 should be constant when the spherical probe tip is made to travel along and in contact with said edge 55'' by movement of the slide 20'. This is a method to be used generally to test for the squareness of two edges on a piece. Now that the plate 55 is set true on the surface plate 29, the X-ordinate of the corner C of the plate 55 is indicated at 51, and its Y-ordinate increased by the radius of the spherical probe tip 52A, at 51'. These coordinates of the reference corner C are made note of, because in relation to them, will the coordinates of other locations on the plate 55, be ascertained. It is evident that these noted coordinates, are to be dealt with as the zero-zero of the point C, and that the dimensions noted on the plan or print of the required piece of work, will determine what the coordinates of the centers of the required holes 56, 57 and 58 should be.

Now if the centers of the holes to be drilled are to be laid out on the stock plate 55 so positioned in the apparatus 15, the probe tip shall be a pointed center punch as 52B, and that the loose probe 52 shall be tapped with a mallet on its top end, when the apparatus is set so that the readings at 51, 51' indicates the respective required coordinates, so the work is marked with a dot at all hole center locations where drilling is to be done thereafter.

Since the slides are very easily movable by a mere finger push, they are brought very near to the required coordinate location as will be indicated at 51, 51'. Then they are edged minutely until the readings at 51, 51' are those of the required coordinates. Such edging is done by first turning the handles 26, 26' so the clutch devices 23 and 23' are closed so the slides are engaged for movement by the micrometer screws 25 and 25' respectively. Then the said screws are turned by the knobs 27, 27' respectively, until the readings at 51, 51' are as required. Then the probe 52 is tapped to mark the work.

Assuming that the work piece started with, already had such holes drilled therein, and it is required to test the correctness of their location; said piece being in a true position on the surface plate and the coordinates of a reference point noted thereon. For such test, the probe tip is frusto conical as 52C, and the slides 20, 21' are free from engagement with their related micrometer screws 25, 25', as shown in FIG. 2. The probe is raised to clear the work, and the slides are moved to allow the probe tip 52C to enter the holes 56, 57 and 58, one at a time and will permit slide movement until it is centered into the hole. Then the readings are taken at 51, 51' and considered in relation to the coordinates at corner C to arrive at the true coordinates of the hole centers in relation to corner C, when the latter is deemed zero-zero.

It is evident from the diagrammatic showing in FIG. 6, that a Z-unit which is identical with the Y-unit, when mounted on the slide 20' of the Y-unit so the slide 20'' of such Z-unit moves along the vertical downwardly to nearly the surface plate 29 and upwardly therefrom, and has a horizontal longitudinally slidable probe 52'' so positioned that its longitudinal axis is coplanar with and perpendicular to the probe 52, that the z-ordinate of any location can be ascertained; said Z-unit of course, being associated with its own optical-electronic system of the type mentioned, which includes its own projector 50'' and an indicating means of the type as 51. It is preferred that said Z-unit shall be counterbalanced by a weight W, as illustrated so its slide 20'' shall be easily moved by a mere finger tip push.

This invention is capable of numerous forms and various applications without departing from the essential features herein disclosed. It is therefore intended and desired that the embodiments shown herein shall be deemed merely illustrative and not restrictive and that the patent shall cover all patentable novelty herein set forth; reference being had to the following claims rather than to the specific description and showings herein to indicate the scope of this invention.

The following are the claims:

1. In an apparatus of the character described, the combination of spaced horizontal first and second parallel track rods fixed on and spanning two spaced frames; the first track rod having a face therealong intermediate two opposite faces therealong, a first bearing which is a channel structure, slidably positioned on the first track rod and having a floor wall intermediate two spaced opposite side walls; said first bearing straddling the first track rod so its floor wall is adjacent said intermediate face on the first track rod, a second bearing slidably mounted on the second track rod for movement therealong, a first slide fixed to and carrying both said bearings, spaced horizontal parallel third and fourth track rods fixed to and extending forwardly from said first slide and perpendicular to said first and second track rods; the third track rod having a face therealong intermediate two opposite faces therealong, a third bearing which is a channel structure, slidably positioned on the third track rod and having a floor wall intermediate two spaced opposite side walls; said third bearing straddling the third track rod so its floor wall is adjacent said intermediate face on the third track rod, a fourth bearing slidably mounted on the fourth track rod for movement therealong, a second slide fixed to and carrying said third and fourth bearings; each of the track rods being spaced from the bearing thereon just sufficient to allow the existence of an air film therebetween, passages through said bearings, adapted for the entrance of compressed air into the spaces between said track rods and their associated bearings, a surface plate horizontally positioned below the third and fourth track rods and extending forwardly of the first and second track rods, a vertical probe carried for vertical sliding movement on the second slide, extending substantially to the surface of said surface plate, a first micrometer screw structure positioned parallel to and along the first and second track rods, carried on and between said side frames, at least part of said screw structure being rotatable, a second micrometer screw structure positioned parallel to and along the third and fourth track rods, carried on and between the first slide and said member at the forward end of the third and fourth track members, at least part of said second screw structure being rotatable, a first thread follower movably mounted on the first slide and normally out of engagement with the first screw structure and adapted to be moved to engage the movable part thereof so that upon turning same, the first slide will move along the first and second track rods a second thread follower movably mounted on the second slide and normally out of engagement with the second screw structure and adapted to be moved to engage the movable part thereof so that upon turning same, the second slide will move along the third and fourth track rods, means to shift said thread followers independently into engagement position and then into disengagement position and means to turn the rotatable parts of said screw structures independently.

2. An apparatus as defined in claim 1, wherein each micrometer screw structure is a single screw mounted only for rotation.

3. An apparatus as defined in claim 1, wherein each micrometer screw structure comprises a relatively long rotatable and slidable screw having a threaded axial socket in one end thereof and a comparatively short fixed screw element threadly engaged in said socket, the number of threads per linear length of a long screw and its related short screw element being in a predetermined relation and in the same direction.

4. An apparatus as defined in claim 1, wherein each thread follower comprises a two-jaw clamp; said jaws being pivotally mounted on the related slide and each jaw being formed with at least one thread-engaging element facing the movable part of the associated micrometer screw structure; said structure being between said jaws and adapted to be threadedly engaged by said elements when said jaws are closed; said jaws being normally part and away from its related screw structure, and said apparatus including a first cam rod journalled for rotation on and extending between said frame members parallel and along the first and second track rods and a second cam rod journalled for rotation on and extending between the first slide and the member at the forward ends of the third and fourth track rods, means to turn said track rods independently, spring means biasing related jaws apart; each of said cam rods being shiftable to bring its related jaws into engagement with their related screw structure, and reversely shiftable to undo such engagement.

5. An apparatus as defined in claim 4, including independent spring means, each biasing one cam rod respectively, to forcibly hold it in the position it is set to allow the jaws associated therewith to be away from the related screw structure and also to forcibly hold it in the position it is set when it brings the jaws together to engage the screw structure.

6. In an apparatus of the character described, the combination of spaced horizontal first and second parallel track rods fixed on and spanning two spaced frames; the first track rod having a face therealong intermediate two opposite faces therealong, a first bearing which is a channel structure, slidably positioned on the first track rod and having a floor wall intermediate two spaced opposite side walls; said first bearing straddling the first track rod so its floor wall is adjacent said intermediate face on the first track rod, a second bearing slidably mounted on the second track rod for movement therealong, a first slide fixed to and carrying both said bearings, spaced horizontal parallel third and fourth track rods fixed to and extending forwardly from said first slide and perpendicular to said first and second track rods; the third track rod having a face therealong intermediate two opposite faces therealong, a third bearing which is a channel structure, slidably positioned on the third track rod and having a floor wall intermediate two spaced opposite side walls; said third bearing straddling the third track rod so its floor wall is adjacent said intermediate face on the third track rod, a fourth bearing slidably mounted on the fourth track rod for movement therealong, a second slide fixed to and carrying said third and fourth bearings; each of the track rods being spaced from the bearing thereon just sufficient to allow the entrance of an air film therebetween, passages through said bearings, adapted for the entrance of compressed air into the spaces between said track rods and their associated bearings, a surface plate horizontally positioned below the third and fourth track rods and extending forwardly of the first and second track rods, a vertical probe carried for vertical sliding movement on the second slide, extending substantially to the surface of said surface plate, a vertical track means extending downwardly from the second slide, a third slide mounted for movement on and along said track means, and a horizontal second probe carried on the third slide for longitudinal movement thereon towards and away from the surface plate; the axes of the probes being coplanar.

7. An apparatus as defined in claim 6, including means on the second slide counter-balancing the third slide, its track means and probe.

References Cited

UNITED STATES PATENTS

| | | | |
|---|---|---|---|
| 1,615,668 | 1/1927 | Anderson | 33—189 |
| 2,353,726 | 7/1944 | Guttmann | 33—189 X |
| 2,618,860 | 11/1952 | Engethart | 33—189 |
| 3,049,807 | 8/1962 | Smeets | 33—165 |
| 3,205,587 | 9/1965 | Kilburn | 33—189 |
| 3,212,194 | 10/1965 | Brault | 33—189 |
| 3,231,319 | 1/1966 | Porath. | |

FOREIGN PATENTS 153,533    6/1932    Switzerland.

WILLIAM D. MARTIN, Jr., *Primary Examiner.*

UNITED STATES PATENT OFFICE
CERTIFICATE OF CORRECTION

Patent No. 3,384,970                                        May 28, 1968

Gary P. Avalear

It is certified that error appears in the above identified patent and that said Letters Patent are hereby corrected as shown below:

In the heading to the printed specification, line 5, and in the sheets of drawings, Sheets 1 and 2, lower right-hand corner, "Garry P. Avalear", each occurrence, should read -- Gary P. Avalear --.

Signed and sealed this 10th day of February 1970.

(SEAL)
Attest:

Edward M. Fletcher, Jr.                      WILLIAM E. SCHUYLER, JR.
Attesting Officer                                      Commissioner of Patents